United States Patent
Jiang et al.

(10) Patent No.: US 12,245,092 B2
(45) Date of Patent: Mar. 4, 2025

(54) COMMUNICATIONS NETWORK SWITCHING METHOD, TERMINAL DEVICE, AND MEDIUM

(71) Applicant: VIVO MOBILE COMMUNICATION CO., LTD., Guangdong (CN)

(72) Inventors: Dajie Jiang, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 387 days.

(21) Appl. No.: 17/586,271

(22) Filed: Jan. 27, 2022

(65) Prior Publication Data
US 2022/0150788 A1    May 12, 2022

Related U.S. Application Data

(63) Continuation of application No. PCT/CN2020/102987, filed on Jul. 20, 2020.

(30) Foreign Application Priority Data

Aug. 6, 2019    (CN) .......................... 201910722888.2

(51) Int. Cl.
*H04W 36/00*    (2009.01)
*H04W 36/14*    (2009.01)
*H04W 36/30*    (2009.01)
*H04W 36/36*    (2009.01)

(52) U.S. Cl.
CPC ....... *H04W 36/0085* (2018.08); *H04W 36/14* (2013.01); *H04W 36/302* (2023.05); *H04W 36/00838* (2023.05); *H04W 36/362* (2023.05)

(58) Field of Classification Search
CPC .. H04W 36/30; H04W 36/0085; H04W 36/14
USPC ........................................................ 370/332
See application file for complete search history.

(56) References Cited

U.S. PATENT DOCUMENTS

| | | | |
|---|---|---|---|
| 2011/0319028 A1 | 12/2011 | Magadi Rangaiah et al. | |
| 2013/0235719 A1 | 9/2013 | Ekici et al. | |
| 2014/0080485 A1* | 3/2014 | Park ................. | H04W 36/1443 455/436 |
| 2015/0056999 A1 | 2/2015 | Olofsson et al. | |
| 2015/0092611 A1 | 4/2015 | Ponukumati et al. | |

(Continued)

FOREIGN PATENT DOCUMENTS

| | | |
|---|---|---|
| CN | 102630389 A | 8/2012 |
| CN | 103916922 A | 7/2014 |

(Continued)

OTHER PUBLICATIONS

The First Office Action of Priority Application No. CN 201910722888.2 issued by the Chinese Patent Office on Feb. 26, 2021.

(Continued)

*Primary Examiner* — Nicholas R Taylor
*Assistant Examiner* — Chong G Kim
(74) *Attorney, Agent, or Firm* — IP & T GROUP LLP

(57) ABSTRACT

A communication processing method includes: detecting whether a first SIM of at least two installed SIMs meets a first trigger condition; and performing communication processing based on a second SIM of the at least two SIMs if the first SIM meets the first trigger condition.

20 Claims, 2 Drawing Sheets

---

Detect whether a first SIM of at least two installed SIMs meets a first trigger condition — S101

The first SIM meets the first trigger condition

Perform communication processing based on a second SIM of the at least two SIMs — S102

(56) References Cited

U.S. PATENT DOCUMENTS

| | | |
|---|---|---|
| 2015/0237497 A1 | 8/2015 | Chen et al. |
| 2016/0204815 A1 | 7/2016 | Su et al. |
| 2018/0098238 A1 | 4/2018 | Saxena et al. |
| 2018/0132146 A1 | 5/2018 | Lee et al. |
| 2022/0210713 A1* | 6/2022 | Hong ................ H04W 36/0011 |
| 2022/0232442 A1* | 7/2022 | Hong .................... H04W 36/08 |
| 2022/0248276 A1* | 8/2022 | Hong .................... H04W 48/18 |
| 2022/0264385 A1* | 8/2022 | Hong ................ H04W 36/0058 |
| 2022/0312292 A1* | 9/2022 | Hong ................ H04W 36/0058 |

FOREIGN PATENT DOCUMENTS

| | | | |
|---|---|---|---|
| CN | 104244447 | A | 12/2014 |
| CN | 104796957 | A | 7/2015 |
| CN | 104853340 | A | 8/2015 |
| CN | 104936243 | A | 9/2015 |
| CN | 106604332 | A | 4/2017 |
| CN | 106817731 | A | 6/2017 |
| CN | 107113672 | A | 8/2017 |
| CN | 107635266 | A | 1/2018 |
| CN | 107889050 | A | 4/2018 |
| CN | 109587701 | A | 4/2019 |
| CN | 109743724 | A | 5/2019 |
| EP | 1530394 | A1 | 5/2005 |
| EP | 2712235 | A2 | 3/2014 |
| EP | 3301993 | A1 | 4/2018 |
| JP | 2016511622 | A | 4/2016 |
| WO | 2015/180779 | A1 | 12/2015 |

OTHER PUBLICATIONS

The Second Office Action of Priority Application No. CN 201910722888.2 issued by the Chinese Patent Office on Sep. 3, 2021.

The Third Office Action of Priority Application No. CN 201910722888.2 issued by the Chinese Patent Office on Jan. 17, 2022.

International Search Report and Written Opinion of International Application No. PCT/CN2020/102987 issued by the Chinese Patent Office on Oct. 21, 2020.

Examination Report for the Indian Patent Application No. 202227008168 issued by the Indian Patent Office on Jul. 21, 2022.

Extended European Search Report for the European Patent Application No. 20849169.6 issued by the European Patent Office on Sep. 12, 2022.

Office Action for the Japanese Patent Application No. 2022-506265 issued by the Japanese Patent Office on Feb. 7, 2023.

Reconsideration Report by Examiner before Appeal for the Japanese Patent Application No. 2022-506265 issued by the Japanese Patent Office on Dec. 25, 2023.

Decision of Refusal for the Japanese Patent Application No. 2022-506265 issued by the Japanese Patent Office on Jul. 4, 2023.

* cited by examiner

COMMUNICATIONS NETWORK SWITCHING METHOD, TERMINAL DEVICE, AND MEDIUM

CROSS-REFERENCE TO RELATED APPLICATIONS

This application is a Bypass Continuation Application of PCT/CN2020/102987 filed on Jul. 20, 2020, which claims priority to Chinese Patent Application No. 201910722888.2 filed on Aug. 6, 2019, which are incorporated herein by reference in their entirety.

TECHNICAL FIELD

This disclosure relates to the field of mobile communications technologies, and in particular, to a communication processing method, a terminal device, and a medium.

BACKGROUND

At present, multiple subscriber identity modules (SIM) can be installed in a terminal device, and the multiple SIMS may be served by the same operator or different operators. When data services of one SIM are poor, a user needs to manually set which SIM is to be selected for data services. Such manual setting of a SIM for data services by the user causes high switching latency and low switching efficiency of a communications network.

SUMMARY

According to one aspect, an embodiment of this disclosure provides a communication processing method, including:
 detecting whether a first SIM of at least two installed SIMs meets a first trigger condition; and
 performing communication processing based on a second SIM of the at least two SIMs if the first SIM meets the first trigger condition.

According to another aspect, an embodiment of this disclosure provides a communication processing apparatus, including:
 a detection module, configured to detect whether a first SIM of at least two installed SIMs meets a first trigger condition; and
 a communication processing module, configured to perform communication processing based on a second SIM of the at least two SIMs if the first SIM meets the first trigger condition.

According to still another aspect, an embodiment of this disclosure provides a terminal device, where the terminal device has at least two SIMS installed, and the terminal device includes a memory, a processor, and a computer program stored in the memory and capable of running on the processor, and
 when the computer program is executed by the processor, the communication processing method provided in the embodiments of this disclosure is implemented.

According to further still another aspect, an embodiment of this disclosure provides a non-transitory computer-readable storage medium, where the non-transitory computer-readable storage medium stores a computer program, and when the computer program is executed by a processor, the communication processing method provided in the embodiments of this disclosure is implemented.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from the accompanying drawings.

DESCRIPTION OF EMBODIMENTS

To make the objectives, technical solutions, and beneficial technical effects of this application clearer, this disclosure is described below in detail with reference to specific embodiments. It should be understood that the embodiments described in this specification are merely intended to interpret this disclosure, but not intended to limit this disclosure.

For simplicity, only some numerical ranges are explicitly disclosed herein. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded.

In the descriptions of this specification, it should be noted that "more than" or "less than" is inclusive of the present number and that "more" in "one or more" means two or more than two, unless otherwise specified.

It should be noted that "/" used in the embodiments of this disclosure means "or". For example, A/B represents A or B; "and/or" used in this application just means a connection relationship about the connected objects. For example, A and/or B represents the following three cases: Only A exists, both A and B exist, and only B exists.

The foregoing invention content of this disclosure is not intended to describe each of the disclosed embodiments or implementations of this disclosure. The following description illustrates example embodiments in more detail by using examples. Throughout this application, guidance is provided by using a series of embodiments and the embodiments may be used in various combinations. In the examples, enumeration is only representative but should not be interpreted as exhaustive.

To resolve the problem in the related art, the embodiments of this disclosure provide a communication processing method, a terminal device, and a medium. The following first describes a communication processing method according to the embodiments of this disclosure. The communication processing method provided in the embodiments of this disclosure may be applied to a terminal device having at least two SIMs installed.

Figure 1:
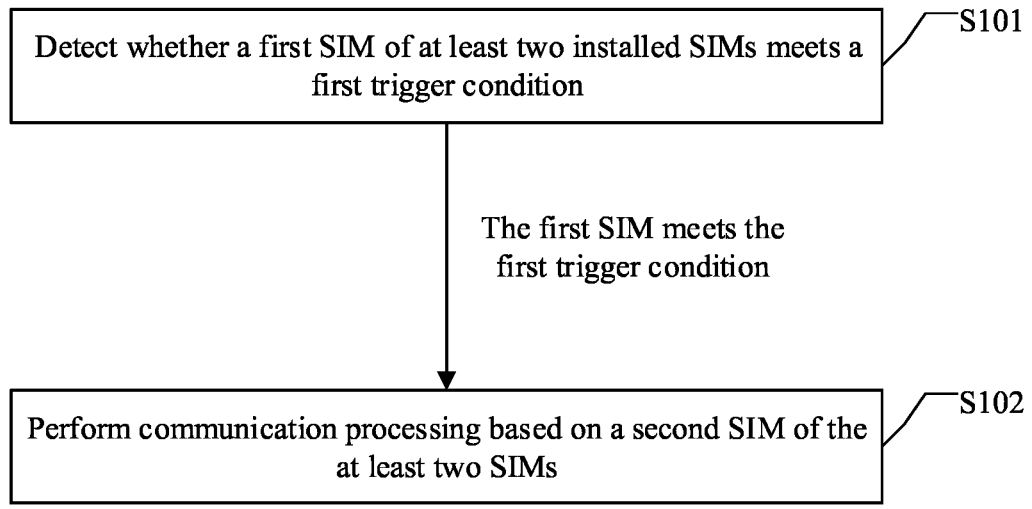
FIG. 1 is a schematic flowchart of a communication processing method according to an embodiment of this disclosure.

FIG. 1 is a schematic flowchart of a communication processing method according to an embodiment of this disclosure. The communication processing method may include the following steps.

S101: Detect whether a first SIM of at least two installed SIMs meets a first trigger condition; and execute S102 if the first SIM meets the first trigger condition.

S102: Perform communication processing based on a second SIM of the at least two SIMS.

In this embodiment of this disclosure, the SIM may be a universal subscriber identity module (USIM), or may be an embedded SIM (eSIM), or other related subscriber identity modules.

A communications network to which the first SIM belongs is a data network used by default or preferentially used by the terminal. Compared with the second SIM, the first SIM may have advantages such as better channel quality of its communications network and lower data traffic charge rates. In this embodiment of this disclosure, when the terminal performs service transmission through the communications network to which the first SIM belongs, if the first SIM meets the first trigger condition, the terminal switches to a communications network to which the second SIM belongs to perform subsequent communication processing.

Alternatively, the terminal may automatically select a communications network for service transmission based on the trigger condition. For example, when detecting that the first SIM meets the first trigger condition, the terminal selects the communications network to which the second SIM belongs to perform subsequent communication processing.

The communication processing in this embodiment of this disclosure includes, but is not limited to: performing data transmission based on the communications network to which the second SIM belongs, establishing a radio resource control (RRC) connection based on the communications network to which the second SIM belongs, and performing measurement on a fourth-generation mobile communications technology 4G communications network cell or a fifth-generation mobile communications technology 5G communications network cell to which the second SIM belongs.

In an embodiment of this disclosure, the terminal device is in an RRC connected state in a communications network to which the first SIM belongs.

The first trigger condition may include at least one of:
that a signal quality of the terminal device in a serving cell of the communications network to which the first SIM belongs is lower than a first preset signal quality;
that an intra-frequency cell handover procedure initiated by the terminal device with respect to the communications network to which the first SIM belongs meets a first condition;
that an inter-frequency cell handover procedure initiated by the terminal device with respect to the communications network to which the first SIM belongs meets a second condition;
that an initial radio access procedure of at least one of radio access technologies (RAT) of an operator corresponding to the communications network to which the first SIM belongs meets a third condition;
that a data rate of the terminal device in the communications network to which the first SIM belongs is lower than a preset data rate;
that resource utilization of the terminal device in the communications network to which the first SIM belongs is lower than preset resource utilization; or
that service access of the terminal device to the communications network to which the first SIM belongs is under control.

In an embodiment of this disclosure, the first condition may include at least one of: handover failure; or handover success, but a signal quality of a target cell corresponding to intra-frequency cell handover is lower than a second preset signal quality.

In an embodiment of this disclosure, the second condition may include at least one of: handover failure; or handover success, but a signal quality of a target cell corresponding to inter-frequency cell handover is lower than a third preset signal quality.

In an embodiment of this disclosure, the third condition may include at least one of: initial access failure; or that a transmission parameter value for initial access is less than a preset transmission parameter threshold, where the transmission parameter includes a signal quality and/or a data rate.

In an embodiment of this disclosure, the terminal device is in an RRC idle state or an RRC inactive state in a communications network to which the first SIM belongs.

The first trigger condition may include at least one of:
that a signal quality of the terminal device in a serving cell of the communications network to which the first SIM belongs is lower than a fourth preset signal quality;
that an intra-frequency cell reselection procedure initiated by the terminal device with respect to the communications network to which the first SIM belongs meets a fourth condition;
that an inter-frequency cell reselection procedure initiated by the terminal device with respect to the communications network to which the first SIM belongs meets a fifth condition;
that an initial radio access procedure of at least one of radio access technologies of an operator corresponding to the communications network to which the first SIM belongs meets a sixth condition; or
that service access of the terminal device to the communications network to which the first SIM belongs is under control.

In an embodiment of this disclosure, the fourth condition may include at least one of: reselection failure; or reselection success, but a signal quality of a target cell corresponding to intra-frequency cell reselection is lower than a fifth preset signal quality.

In an embodiment of this disclosure, the fifth condition may include at least one of: reselection failure; or reselection success, but a signal quality of a target cell corresponding to inter-frequency cell reselection is lower than a sixth preset signal quality.

In an embodiment of this disclosure, the sixth condition may include at least one of: initial access failure, where a signal quality of the initial access is lower than a preset signal quality threshold.

In an embodiment of this disclosure, the terminal device is in an RRC idle state or an RRC inactive state in a communications network to which the second SIM belongs. The first trigger condition may further include:
that a signal quality of the terminal device in a serving cell of the communications network to which the second SIM belongs is higher than the signal quality of the terminal device in the serving cell of the communications network to which the first SIM belongs.

In an embodiment of this disclosure, the signal quality may include at least one of:

reference signal received power (RSRP), reference signal received quality (RSRQ), signal-to-interference-plus-noise ratio (SINR), or received signal strength indicator (RSSI).

The data rate may be an uplink data rate or a downlink data rate; and the resource utilization may be a percentage of resource blocks (RB) allocated to the terminal device in RBs of the entire system.

Service access of the terminal device to the communications network to which the first SIM belongs is under control. For example, the communications network initiates access forbiddance for a service, or the terminal device attempts to initiate access for a service which is forbidden.

In an embodiment of this disclosure, the second SIM may include a SIM corresponding to a target communications network, where a priority of the target communications network is higher than priority(ies) of communications network(s) to which other SIM(s) of the at least two SIMS belong.

In an embodiment of this disclosure, when the terminal device is in an RRC connected state in the communications network to which the second SIM belongs, the terminal device may perform data transmission based on the communications network to which the second SIM belongs, and may also switch from the communications network to which the first SIM belongs to the communications network to which the second SIM belongs, and perform data transmission based on the communications network to which the second SIM belongs.

For example, the terminal device is in an RRC connected state in the communications network to which the second SIM belongs, and the terminal device is in an RRC connected state in the communications network to which the first SIM belongs; and if the first SIM meets the first trigger condition, the terminal device may perform data transmission based on the communications network to which the second SIM belongs.

In this case, the first trigger condition may include one of the following:

Trigger Condition 1: a signal quality of the terminal device in a serving cell of the communications network to which the first SIM belongs is lower than a preset threshold;

Trigger Condition 2: the terminal device fails to initiate intra-frequency cell handover with respect to the communications network to which the first SIM belongs; or the terminal device succeeds in initiating intra-frequency cell handover with respect to the communications network to which the first SIM belongs, but a signal quality of a target cell corresponding to intra-frequency cell handover is lower than a preset threshold;

Trigger Condition 3: the terminal device fails to initiate inter-frequency cell handover with respect to the communications network to which the first SIM belongs; or the terminal device succeeds in initiating inter-frequency cell handover with respect to the communications network to which the first SIM belongs, but a signal quality of a target cell corresponding to inter-frequency cell handover is lower than a preset threshold;

Trigger Condition 4: initial access failure through at least one of the radio access technologies of the operator corresponding to the communications network to which the first SIM belongs; or a signal quality or an uplink data rate or a downlink data rate of a cell initially accessed through at least one of the radio access technologies of the operator corresponding to the communications network to which the first SIM belongs is lower than a preset threshold;

Trigger Condition 5: an uplink data rate or a downlink data rate of the terminal device in the communications network to which the first SIM belongs is lower than a preset threshold;

Trigger Condition 6: uplink resource utilization or downlink resource utilization of the terminal device in the communications network to which the first SIM belongs is lower than a preset threshold; and Trigger Condition 7: service access of the terminal device to the communications network to which the first SIM belongs is under control.

In an embodiment of this disclosure, the first trigger condition may also be a combination of the foregoing different trigger conditions. The embodiments of this disclosure do not require a particular number of conditions in the combination, provided that the conditions in the combination are not mutually exclusive.

In an optional embodiment, the first trigger condition may include a combination of the foregoing Trigger Condition 2, Trigger Condition 3, and Trigger Condition 4.

For another example, the terminal device is in an RRC connected state in the communications network to which the second SIM belongs, and the terminal device is in an RRC idle state or an RRC inactive state in the communications network to which the first SIM belongs; and if the first SIM meets the first trigger condition, the terminal device may perform data transmission based on the communications network to which the second SIM belongs. The terminal device may alternatively switch from the communications network to which the first SIM belongs to the communications network to which the second SIM belongs, and perform data transmission based on the communications network to which the second SIM belongs.

In this case, the first trigger condition may include one of the following:

Trigger Condition 1: a signal quality of the terminal device in a serving cell of the communications network to which the first SIM belongs is lower than a preset threshold;

Trigger Condition 2: the terminal device fails to initiate intra-frequency cell reselection with respect to the communications network to which the first SIM belongs; or the terminal device succeeds in initiating intra-frequency cell reselection with respect to the communications network to which the first SIM belongs, but a signal quality of a target cell corresponding to intra-frequency cell reselection is lower than a preset threshold;

Trigger Condition 3: the terminal device fails to initiate inter-frequency cell reselection with respect to the communications network to which the first SIM belongs; or the terminal device succeeds in initiating inter-frequency cell reselection with respect to the communications network to which the first SIM belongs, but a signal quality of a target cell corresponding to inter-frequency cell reselection is lower than a preset threshold;

Trigger Condition 4: initial access failure through at least one of the radio access technologies of the operator corresponding to the communications network to which the first SIM belongs; or a signal quality of a cell initially accessed through at least one of the radio access technologies of the operator corresponding to the communications network to which the first SIM belongs is lower than a preset threshold; and Trigger Condition 5: service access of the terminal device to the communications network to which the first SIM belongs is under control.

In an embodiment of this disclosure, the first trigger condition may also be a combination of the foregoing different trigger conditions. The embodiments of this disclosure do not require a particular number of conditions in the combination, provided that the conditions in the combination are not mutually exclusive.

In an optional embodiment, the first trigger condition may include a combination of the foregoing Trigger Condition 2, Trigger Condition 3, and Trigger Condition 4.

According to the communication processing method provided in this embodiment of this disclosure, when it is detected that the first SIM of the at least two installed SIMS meets the first trigger condition, data transmission is performed based on the communications network to which the second SIM belongs, to reduce a switchover delay of the communications network and improve switching efficiency of the communications network.

In an embodiment of this disclosure, when the terminal device is in an RRC idle state or an RRC inactive state in the communications network to which the second SIM belongs, if the first SIM meets the first trigger condition, the terminal device may establish an RRC connection based on the communications network to which the second SIM belongs. Then the terminal device performs data transmission based on the communications network to which the second SIM belongs and with which the RRC connection is established. The terminal device may alternatively switch from the communications network to which the first SIM belongs to the communications network to which the second SIM belongs, and perform data transmission based on the communications network to which the second SIM belongs and with which the RRC connection is established.

For example, the terminal device is in an RRC idle state or an RRC inactive state in the communications network to which the second SIM belongs, and the terminal device is in an RRC connected state in the communications network to which the first SIM belongs; and if the first SIM meets the first trigger condition, the terminal device may establish an RRC connection based on the communications network to which the second SIM belongs. Then the terminal device performs data transmission based on the communications network to which the second SIM belongs and with which the RRC connection is established. The terminal device may alternatively switch from the communications network to which the first SIM belongs to the communications network to which the second SIM belongs, and perform data transmission based on the communications network to which the second SIM belongs and with which the RRC connection is established.

In this case, the first trigger condition may include one of the following:

Trigger Condition 1: a signal quality of the terminal device in a serving cell of the communications network to which the first SIM belongs is lower than a preset threshold;

Trigger Condition 2: the terminal device fails to initiate intra-frequency cell handover with respect to the communications network to which the first SIM belongs; or the terminal device succeeds in initiating intra-frequency cell handover with respect to the communications network to which the first SIM belongs, but a signal quality of a target cell corresponding to intra-frequency cell handover is lower than a preset threshold;

Trigger Condition 3: the terminal device fails to initiate inter-frequency cell handover with respect to the communications network to which the first SIM belongs; or the terminal device succeeds in initiating inter-frequency cell handover with respect to the communications network to which the first SIM belongs, but a signal quality of a target cell corresponding to inter-frequency cell handover is lower than a preset threshold;

Trigger Condition 4: initial access failure through at least one of the radio access technologies of the operator corresponding to the communications network to which the first SIM belongs; or a signal quality or an uplink data rate or a downlink data rate of a cell initially accessed through at least one of the radio access technologies of the operator corresponding to the communications network to which the first SIM belongs is lower than a preset threshold;

Trigger Condition 5: an uplink data rate or a downlink data rate of the terminal device in the communications network to which the first SIM belongs is lower than a preset threshold;

Trigger Condition 6: uplink resource utilization or downlink resource utilization of the terminal device in the communications network to which the first SIM belongs is lower than a preset threshold; and Trigger Condition 7: service access of the terminal device to the communications network to which the first SIM belongs is under control.

In an embodiment of this disclosure, the first trigger condition may also be a combination of the foregoing different trigger conditions. The embodiments of this disclosure do not require a particular number of conditions in the combination, provided that the conditions in the combination are not mutually exclusive.

In an optional embodiment, the first trigger condition may include a combination of the foregoing Trigger Condition 2, Trigger Condition 3, and Trigger Condition 4.

For another example, the terminal device is in an RRC idle state or an RRC inactive state in the communications network to which the second SIM belongs, and the terminal device is in an RRC idle state or an RRC inactive state in the communications network to which the first SIM belongs; and if the first SIM meets the first trigger condition, the terminal device may establish an RRC connection based on the communications network to which the second SIM belongs. Then the terminal device performs data transmission based on the communications network to which the second SIM belongs and with which the RRC connection is established. The terminal device may alternatively switch from the communications network to which the first SIM belongs to the communications network to which the second SIM belongs, and perform data transmission based on the communications network to which the second SIM belongs and with which the RRC connection is established.

In this case, the first trigger condition may include one of the following:

Trigger Condition 1: a signal quality of the terminal device in a serving cell of the communications network to which the first SIM belongs is lower than a preset threshold;

Trigger Condition 2: the terminal device fails to initiate intra-frequency cell reselection with respect to the communications network to which the first SIM belongs; or the terminal device succeeds in initiating intra-frequency cell reselection with respect to the communications network to which the first SIM belongs, but a signal quality of a target cell corresponding to intra-frequency cell reselection is lower than a preset threshold;

Trigger Condition 3: the terminal device fails to initiate inter-frequency cell reselection with respect to the communications network to which the first SIM belongs; or the terminal device succeeds in initiating inter-frequency cell reselection with respect to the communications network to which the first SIM belongs, but a signal quality of a target cell corresponding to inter-frequency cell reselection is lower than a preset threshold;

Trigger Condition 4: initial access failure through at least one of the radio access technologies of the operator corresponding to the communications network to which the first SIM belongs; or a signal quality of a cell initially accessed through at least one of the radio access technologies of the operator corresponding to the communications network to which the first SIM belongs is lower than a preset threshold; and Trigger Condition 5: service access of the terminal device to the communications network to which the first SIM belongs is under control; and Trigger Condition 6: a signal quality of the terminal device in a serving cell of the communications network to which the second SIM belongs is higher than the signal quality of the terminal device in the serving cell of the communications network to which the first SIM belongs.

In an embodiment of this disclosure, the first trigger condition may also be a combination of the foregoing different trigger conditions. The embodiments of this disclosure do not require a particular number of conditions in the combination, provided that the conditions in the combination are not mutually exclusive.

In an optional embodiment, the first trigger condition may include a combination of the foregoing Trigger Condition 2, Trigger Condition 3, and Trigger Condition 4.

According to the communication processing method provided in this embodiment of this disclosure, when it is detected that the first SIM of the at least two installed SIMS meets the first trigger condition, an RRC connection is established based on the communications network to which the second SIM belongs, and data transmission is performed based on the communications network to which the second SIM belongs and with which the RRC connection is established, which can reduce switching latency of the communications network and improve switching efficiency of the communications network.

In an embodiment of this disclosure, when the terminal device camps on a second-generation mobile communications technology 2G communications network cell or a third-generation mobile communications technology 3G communications network cell to which the second SIM belongs, the terminal device may perform cell measurement on a fourth-generation mobile communications technology 4G communications network cell or a fifth-generation mobile communications technology 5G communications network cell to which the second SIM belongs, to obtain a cell measurement result; then establish, based on the cell measurement result, an RRC connection to the communications network to which the second SIM belongs; and perform data transmission based on the communications network to which the second SIM belongs and with which the RRC connection is established. The terminal device may alternatively switch from the communications network to which the first SIM belongs to the communications network to which the second SIM belongs, and perform data transmission based on the communications network to which the second SIM belongs and with which the RRC connection is established.

For example, the terminal device camps on a 2G communications network cell or 3G communications network cell to which the second SIM belongs, and the terminal device is in an RRC connected state in the communications network to which the first SIM belongs; if the first SIM meets the first trigger condition, the terminal device may perform cell measurement on a 4G communications network cell or 5G communications network cell to which the second SIM belongs, to obtain a cell measurement result; then establish, based on the cell measurement result, an RRC connection to the communications network to which the second SIM belongs; and perform data transmission based on the communications network to which the second SIM belongs and with which the RRC connection is established.

In this case, the first trigger condition may include at least one of:

Trigger Condition 1: a signal quality of the terminal device in a serving cell of the communications network to which the first SIM belongs is lower than a preset threshold;

Trigger Condition 2: the terminal device fails to initiate intra-frequency cell handover with respect to the communications network to which the first SIM belongs; or the terminal device succeeds in initiating intra-frequency cell handover with respect to the communications network to which the first SIM belongs, but a signal quality of a target cell corresponding to intra-frequency cell handover is lower than a preset threshold;

Trigger Condition 3: the terminal device fails to initiate inter-frequency cell handover with respect to the communications network to which the first SIM belongs; or the terminal device succeeds in initiating inter-frequency cell handover with respect to the communications network to which the first SIM belongs, but a signal quality of a target cell corresponding to inter-frequency cell handover is lower than a preset threshold;

Trigger Condition 4: initial access failure through at least one of the radio access technologies of the operator corresponding to the communications network to which the first SIM belongs; or a signal quality or an uplink data rate or a downlink data rate of a cell initially accessed through at least one of the radio access technologies of the operator corresponding to the communications network to which the first SIM belongs is lower than a preset threshold;

Trigger Condition 5: an uplink data rate or a downlink data rate of the terminal device in the communications network to which the first SIM belongs is lower than a preset threshold;

Trigger Condition 6: uplink resource utilization or downlink resource utilization of the terminal device in the communications network to which the first SIM belongs is lower than a preset threshold; or Trigger Condition 7: service access of the terminal device to the communications network to which the first SIM belongs is under control.

In an embodiment of this disclosure, the first trigger condition may also be a combination of the foregoing different trigger conditions. The embodiments of this disclosure do not require a particular number of conditions in the combination, provided that the conditions in the combination are not mutually exclusive.

In an optional embodiment, the first trigger condition may include a combination of the foregoing Trigger Condition 2, Trigger Condition 3, and Trigger Condition 4.

For another example, the terminal device camps on a 2G communications network cell or 3G communications network cell to which the second SIM belongs, and the terminal device is in an RRC idle state or an RRC inactive state in the communications network to which the first SIM belongs; if the first SIM meets the first trigger condition, the terminal device may perform cell measurement on a 4G communications network cell or 5G communications network cell to which the second SIM belongs, to obtain a cell measurement result; then establish, based on the cell measurement result, an RRC connection to the communications network to which the second SIM belongs; and perform data transmission based on the communications network to which the second SIM belongs and with which the RRC connection is established. The terminal device may alternatively switch from the communications network to which the first SIM belongs to the communications network to which the second SIM belongs, and perform data transmission based on the communications network to which the second SIM belongs and with which the RRC connection is established.

In this case, the first trigger condition may include one of the following:

Trigger Condition 1: a signal quality of the terminal device in a serving cell of the communications network to which the first SIM belongs is lower than a preset threshold;

Trigger Condition 2: the terminal device fails to initiate intra-frequency cell reselection with respect to the communications network to which the first SIM belongs; or the terminal device succeeds in initiating intra-frequency cell reselection with respect to the communications network to which the first SIM belongs, but a signal quality of a target cell corresponding to intra-frequency cell reselection is lower than a preset threshold;

Trigger Condition 3: the terminal device fails to initiate inter-frequency cell reselection with respect to the communications network to which the first SIM belongs; or the terminal device succeeds in initiating inter-frequency cell reselection with respect to the communications network to which the first SIM belongs, but a signal quality of a target cell corresponding to inter-frequency cell reselection is lower than a preset threshold;

Trigger Condition 4: initial access failure through at least one of the radio access technologies of the operator corresponding to the communications network to which the first SIM belongs; or a signal quality of a cell initially accessed through at least one of the radio access technologies of the operator corresponding to the communications network to which the first SIM belongs is lower than a preset threshold; and Trigger Condition 5: service access of the terminal device to the communications network to which the first SIM belongs is under control.

In an embodiment of this disclosure, the first trigger condition may also be a combination of the foregoing different trigger conditions. The embodiments of this disclosure do not require a particular number of conditions in the combination, provided that the conditions in the combination are not mutually exclusive.

In an optional embodiment, the first trigger condition may include a combination of the foregoing Trigger Condition 2, Trigger Condition 3, and Trigger Condition 4.

According to the communication processing method provided in this embodiment of this disclosure, when it is detected that the first SIM of the at least two installed SIMS meets the first trigger condition, measurement is performed on a 4G communications network cell or 5G communications network cell to which the second SIM belongs, to obtain a cell measurement result; preparation is made in advance for a connection to the 4G communications network cell or 5G communications network cell, and data transmission is performed based on the communications network to which the second SIM belongs and with which the RRC connection is established, which can reduce switching latency of the communications network and improve switching efficiency of the communications network.

In an embodiment of this disclosure, data transmission is performed based on the first SIM if the first SIM meets a second trigger condition.

If the communications network to which the first SIM belongs is a data network used by default or preferentially used by the terminal, in this embodiment of this disclosure, when the terminal uses the communications network to which the first SIM belongs to perform service transmission, if the first SIM meets the first trigger condition, the terminal switches to the communications network to which the second SIM belongs; when the terminal uses the communications network to which the second SIM belongs to perform service transmission, if the first SIM meets the second trigger condition, the terminal switches from the communications network to which the second SIM belongs to the communications network to which the first SIM belongs, to perform subsequent communication processing.

Alternatively, the terminal may automatically select a communications network for service transmission based on the trigger condition. For example, when detecting that the first SIM meets the second trigger condition, the terminal selects the communications network to which the first SIM belongs to perform subsequent communication processing.

In an embodiment of this disclosure, the second trigger condition may include:

a signal quality of a serving cell of a communications network to which the first SIM belongs is higher than a seventh preset signal quality.

For example, when the terminal device measures a signal quality of a serving cell of the communications network to which the first SIM belongs, and finds that the signal quantity of the serving cell is higher than a seventh preset signal quality, even if the signal quality of the communications network to which the second SIM belongs is still good, the terminal device should preferentially return to the communications network to which the first SIM belongs, and in this case, the terminal device needs to perform data transmission based on the first SIM. For example, the RRC connection to the communications network to which the second SIM belongs is released and an RRC connection is established based on the communications network to which the first SIM belongs; and data transmission is performed based on the communications network to which the first SIM belongs and with which the RRC connection is established.

Figure 2:
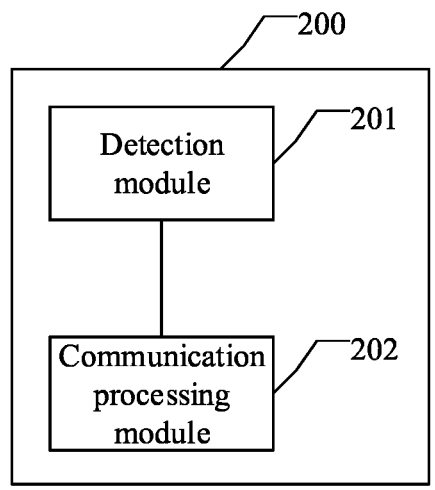
FIG. 2 is a schematic flowchart of a communication processing apparatus according to an embodiment of this disclosure.

Corresponding to the foregoing method embodiment, an embodiment of this disclosure further provides a communication processing apparatus. As shown in FIG. 2, FIG. 2 is a schematic flowchart of a communication processing apparatus according to an embodiment of this disclosure. The communication processing apparatus 200 may include:

a detection module 201, configured to detect whether a first SIM of at least two SIMs meets a first trigger condition; and a communication processing module 202, configured to perform communication processing based on a second SIM of the at least two SIMs if the first SIM meets the first trigger condition.

In an embodiment of this disclosure, the terminal device is in an RRC connected state in a communications network to which the first SIM belongs.

The first trigger condition includes at least one of:

that a signal quality of the terminal device in a serving cell of the communications network to which the first SIM belongs is lower than a first preset signal quality;

that an intra-frequency cell handover procedure initiated by the terminal device with respect to the communications network to which the first SIM belongs meets a first condition;

that an inter-frequency cell handover procedure initiated by the terminal device with respect to the communications network to which the first SIM belongs meets a second condition;

that an initial radio access procedure of at least one of radio access technologies of an operator corresponding to the communications network to which the first SIM belongs meets a third condition;

that a data rate of the terminal device in the communications network to which the first SIM belongs is lower than a preset data rate;

that resource utilization of the terminal device in the communications network to which the first SIM belongs is lower than preset resource utilization; or that service access of the terminal device to the communications network to which the first SIM belongs is under control.

In an embodiment of this disclosure, the first condition may include at least one of: handover failure; or handover success, but a signal quality of a target cell corresponding to intra-frequency cell handover is lower than a second preset signal quality.

In an embodiment of this disclosure, the second condition may include at least one of: handover failure; or handover success, but a signal quality of a target cell corresponding to inter-frequency cell handover is lower than a third preset signal quality.

In an embodiment of this disclosure, the third condition may include at least one of: initial access failure; or that a transmission parameter value for initial access is less than a preset transmission parameter threshold, where the transmission parameter includes a signal quality and/or a data rate.

In an embodiment of this disclosure, the terminal device is in an RRC idle state or an RRC inactive state in a communications network to which the first SIM belongs.

The first trigger condition includes at least one of:

that a signal quality of the terminal device in a serving cell of the communications network to which the first SIM belongs is lower than a fourth preset signal quality;

that an intra-frequency cell reselection procedure initiated by the terminal device with respect to the communications network to which the first SIM belongs meets a fourth condition;

that an inter-frequency cell reselection procedure initiated by the terminal device with respect to the communications network to which the first SIM belongs meets a fifth condition;

that an initial radio access procedure of at least one of radio access technologies of an operator corresponding to the communications network to which the first SIM belongs meets a sixth condition; or that service access of the terminal device to the communications network to which the first SIM belongs is under control.

In an embodiment of this disclosure, the fourth condition may include at least one of: reselection failure; or reselection success, but a signal quality of a target cell corresponding to intra-frequency cell reselection is lower than a fifth preset signal quality.

In an embodiment of this disclosure, the fifth condition may include at least one of: reselection failure; or reselection success, but a signal quality of a target cell corresponding to inter-frequency cell reselection is lower than a sixth preset signal quality.

In an embodiment of this disclosure, the sixth condition may include at least one of: initial access failure, where a signal quality of the initial access is lower than a preset signal quality threshold.

In an embodiment of this disclosure, the terminal device is in an RRC idle state or an RRC inactive state in a communications network to which the second SIM belongs.

The first trigger condition may further include:

that a signal quality of the terminal device in a serving cell of the communications network to which the second SIM belongs is higher than the signal quality of the terminal device in the serving cell of the communications network to which the first SIM belongs.

In an embodiment of this disclosure, the signal quality includes at least one of:

reference signal received power, reference signal received quality, signal to interference plus noise ratio, or received signal strength indicator.

In an embodiment of this disclosure, the second SIM may include:

a SIM corresponding to a target communications network, where a priority of the target communications network is higher than priority(ies) of communications network(s) to which other SIM(s) of the at least two SIMs belong.

In an embodiment of this disclosure, the terminal device is in an RRC connected state in a communications network to which the second SIM belongs; and the communication processing module may be configured to:

perform data transmission based on the communications network to which the second SIM belongs.

In an embodiment of this disclosure, the terminal device is in an RRC idle state or an RRC inactive state in a communications network to which the second SIM belongs; and the communication processing module may be configured to:

establish an RRC connection based on the communications network to which the second SIM belongs.

In an embodiment of this disclosure, the communication processing module may further be configured to:

perform data transmission based on the communications network to which the second SIM belongs and with which the RRC connection is established.

In an embodiment of this disclosure, the terminal device camps on a 2G communications network cell or 3G communications network cell to which the second SIM belongs; and the communication processing module may be configured to:

perform measurement on a 4G communications network cell or 5G communications network cell to which the second SIM belongs to obtain a cell measurement result.

In an embodiment of this disclosure, the communication processing module may further be configured to:

establish an RRC connection based on the cell measurement result and the communications network to which the second SIM belongs; and perform data transmission based on the communications network to which the second SIM belongs and with which the RRC connection is established.

In an embodiment of this disclosure, the communication processing module may further be configured to:

perform data transmission based on the first SIM if the first SIM meets a second trigger condition.

In an embodiment of this disclosure, the second trigger condition may include:

a signal quality of a serving cell of a communications network to which the first SIM belongs is higher than a seventh preset signal quality.

Figure 3:
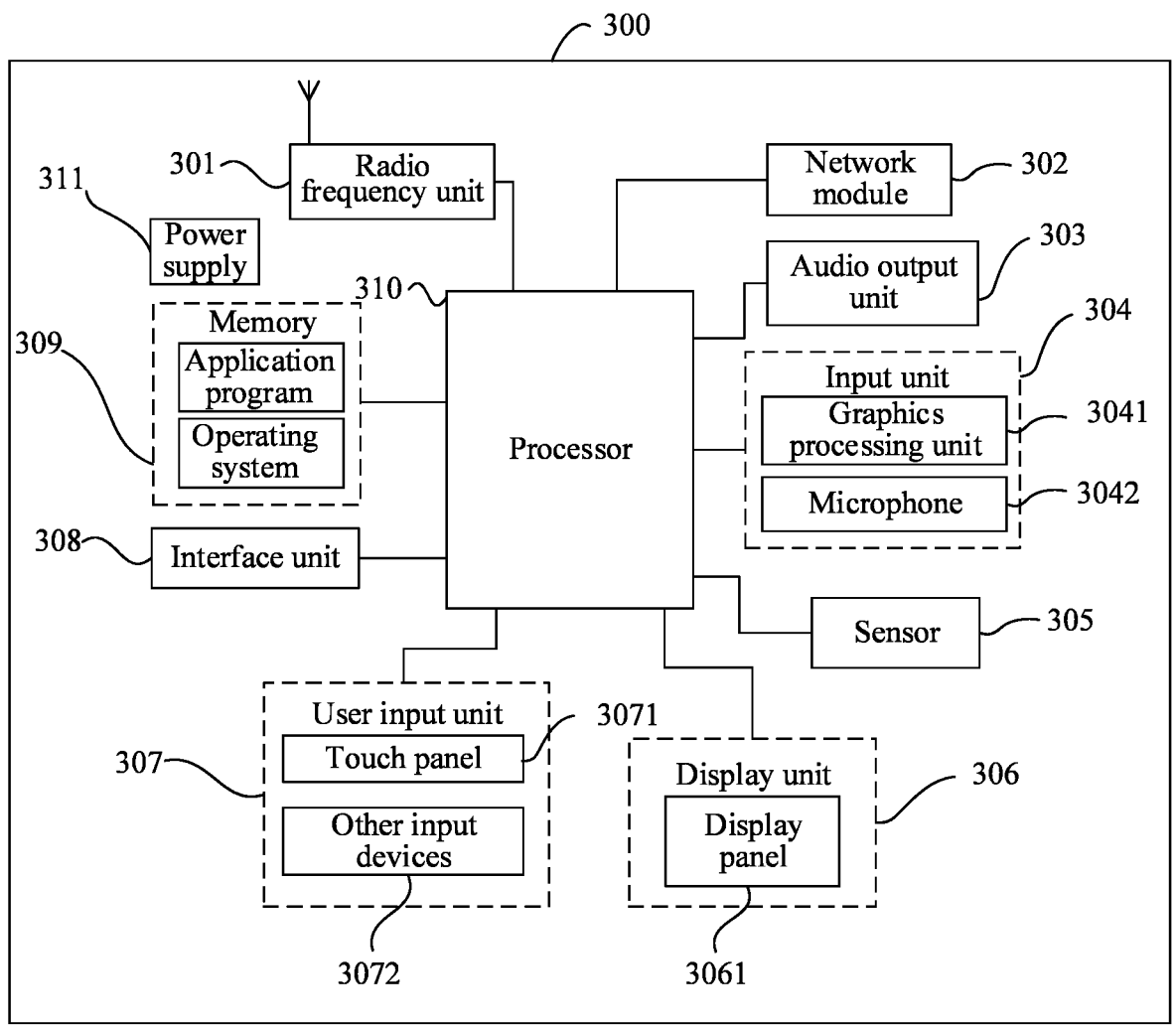
FIG. 3 is a schematic structural diagram of hardware of a terminal device according to an embodiment of this disclosure.

FIG. 3 is a schematic structural diagram of hardware of a terminal device according to an embodiment of this disclosure. The terminal 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the terminal device is not limited to the terminal device structure shown in FIG. 3. The terminal device may include more or fewer components than those shown in the figure, or combine some of the components, or arrange the components differently. In this embodiment of this disclosure, the terminal device includes but is not limited to a mobile phone, a tablet computer, a laptop computer, a palmtop computer, an in-vehicle terminal, a wearable device, a pedometer, and the like.

The radio frequency unit 301 is configured to detect whether a first SIM of at least two installed SIMs meets a first trigger condition; and perform communication processing based on a second SIM of the at least two SIMs if the first SIM meets the first trigger condition.

According to this embodiment of this disclosure, when it is detected that the first SIM of the at least two installed SIMs meets the first trigger condition, communication processing is performed based on the second SIM of the at least two SIMS, which can reduce switching latency of the communications network and improve switching efficiency of the communications network.

It should be understood that, in this embodiment of this disclosure, the radio frequency unit 301 may be configured to transmit and receive a signal in an information transmitting/receiving or call process. For example, the radio frequency unit 301 receives downlink data from a base station and transmits the downlink data to the processor 310 for processing; and transmits uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may also communicate with a network and other devices via a wireless communications system.

The terminal device provides wireless broadband Internet access for a user by using the network module 302, for example, helping the user transmit and receive e-mails, browse web pages, and access streaming media.

The audio output unit 303 may convert audio data received by the radio frequency unit 301 or the network module 302 or stored in the memory 309 into an audio signal and output the audio signal as a sound. In addition, the audio output unit 303 may further provide audio output (for example, a call signal received sound or a message received sound) that is related to a specific function performed by the terminal device 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042, and the graphics processing unit 3041 processes image data of a still picture or a video obtained by an image capture apparatus (for example, a camera) in an image capture mode or a video capture mode. A processed image frame may be displayed on the display unit 306. The image frame processed by the graphics processing unit 3041 may be stored in the memory 309 (or another storage medium) or transmitted by using the radio frequency unit 301 or the network module 302. The microphone 3042 can receive sounds and processing such sounds into audio data. The processed audio data can be converted in a telephone call mode into a format that can be transmitted by the radio frequency unit 301 to a mobile communication base station, for outputting.

The terminal device 300 further includes at least one sensor 305, for example, an optical sensor, a motion sensor, and other sensors. For example, the optical sensor includes an ambient light sensor and a proximity sensor. The ambient light sensor may adjust brightness of a display panel 3061 based on intensity of ambient light. When the terminal device 300 moves near an ear, the proximity sensor may disable the display panel 3061 and/or backlight. As a motion sensor, an accelerometer sensor may detect magnitudes of an acceleration in various directions (usually three axes), may detect a magnitude and a direction of gravity when the terminal is static, and may be configured to recognize a posture of the terminal device (for example, landscape/portrait mode switching, a related game, or magnetometer posture calibration), provide a function related to vibration recognition (for example, a pedometer or a keystroke), or the like. The sensor 305 may further include a fingerprint sensor, a pressure sensor, an iris sensor, a molecular sensor, a gyroscope, a barometer, a hygrometer, a thermometer, or an infrared sensor. Details are not described herein.

The display unit 306 is configured to display information input by the user or information provided to the user. The display unit 306 may include the display panel 3061. The display panel 3061 may be configured in a form of a liquid crystal display (LCD), an organic light-emitting diode (OLED), or the like.

The user input unit 307 may be configured to receive input digit or character information, and generate key signal input that is related to user setting and function control of the terminal device. For example, the user input unit 307 includes a touch panel 3071 and other input devices 3072. The touch panel 3071, or referred to as a touchscreen, may capture a touch operation performed by a user on or near the touch panel 3071 (for example, an operation performed by the user on the touch panel 3071 or near the touch panel 3071 by using any appropriate object or accessory such as a finger or a stylus). The touch panel 3071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 310, and receives and executes a command transmitted by the processor 310. In addition, the touch panel 3071 may be implemented in a plurality of forms, for example, as a resistive, capacitive, infrared, or surface acoustic wave touch panel. In addition to the touch panel 3071, the user input unit 307 may further include other input devices 3072. For example, the other input devices 3072 may include but are not limited to a physical keyboard, a function key (for example, a volume control key or a switch key), a trackball, a mouse, and a joystick. Details are not described herein.

Optionally, the touch panel 3071 may cover the display panel 3061. After detecting a touch operation on or near the touch panel 3071, the touch panel 3071 transmits the touch operation to the processor 310 for determining a type of the touch event. Then the processor 310 provides corresponding visual output on the display panel 3061 based on the type of the touch event. In FIG. 3, the touch panel 3071 and the display panel 3061 serve as two separate components to implement input and output functions of the terminal device. However, in some embodiments, the touch panel 3071 and the display panel 3061 may be integrated to implement the input and output functions of the terminal device. This is not specifically limited herein.

The interface unit 308 is an interface for connecting an external apparatus to the terminal device 300. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 308 may be configured to receive input (for example, data information and electric power) from the external apparatus, and transmit the received input to one or more elements in the terminal device 300; or may be configured to transmit data between the terminal device 300 and the external apparatus.

The memory 309 may be configured to store software programs and various data. The memory 309 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 309 may include a high-speed random access memory, and may further include a non-volatile memory such as a disk storage device, a flash memory device, or another volatile solid-state storage device.

The processor 310 is a control center of the terminal device, which uses various interfaces and lines to connect all parts of the entire terminal device, and performs various functions and data processing of the terminal device by running or executing the software program and/or module stored in the memory 309 and invoking data stored in the memory 309, thereby implementing overall monitoring on the terminal device. The processor 310 may include one or more processing units. Optionally, the processor 310 may integrate an application processor and a modem processor. The application processor mainly processes an operating system, a user interface, an application program, and the like. The modem processor mainly processes wireless communication. It can be understood that the modem processor may alternatively be not integrated in the processor 310.

The terminal device 300 may further include the power supply 311 (for example, a battery) that supplies power to the components. Optionally, the power supply 311 may be logically connected to the processor 310 through a power management system, so as to implement functions such as charging management, discharging management, and power consumption management through the power management system.

In addition, the terminal device 300 includes some functional modules that are not shown. Details are not described herein.

Optionally, an embodiment of this disclosure further provides a terminal device, including a processor 310, a memory 309, and a computer program stored in the memory 309 and capable of running on the processor 310. When the computer program is executed by the processor 310, the processes of the foregoing communication processing method embodiment are implemented, with the same technical effects achieved. To avoid repetition, details are not described herein again.

An embodiment of this disclosure further provides a non-transitory computer-readable storage medium, where the non-transitory computer-readable storage medium stores a computer program instruction, and when the computer program instruction is executed by a processor, the processes of the communication processing method embodiments provided in the embodiments of this disclosure are implemented, with the same technical effects achieved. To avoid repetition, details are not described herein again. Examples of the non-transitory computer-readable storage medium include a read-only memory (ROM), a random access memory (RAM), a magnetic disk, or an optical disc.

The various aspects of this disclosure have been described above with reference to the flowcharts and/or block diagrams of the method, the apparatus (system), and the computer program product according to the embodiments of this disclosure. It should be understood that each block in the flowcharts and/or block diagrams and a combination of blocks in the flowcharts and/or block diagrams can be implemented by computer program instructions. These computer program instructions can be provided to a processor of a general-purpose computer, a dedicated computer, or another programmable data processing apparatus to produce a machine, so that these instructions executed by the processor of the computer or another programmable data processing apparatus enable the implementation of the functions/actions specified in one or more blocks of the flowchart and/or block diagram. Such processor can be, but is not limited to, a general-purpose processor, a dedicated processor, a special application processor, or a field programmable logic circuit. It should be also understood that each block in the block diagrams and/or the flowcharts and a combination of the blocks in the block diagrams and/or the flowcharts may be implemented by a dedicated hardware for executing a specified function or action or may be implemented by a combination of dedicated hardware and computer instructions.

It should be noted that although the foregoing embodiments have been described in this specification, the scope of protection of this disclosure is not limited thereto. Therefore, changes and modifications to the embodiments described herein based on the innovative ideas of this disclosure, equivalent structures or equivalent process transformations made using the content of the specification and accompanying drawings of this disclosure, and direct or indirect application of the above technical solutions to other related technical fields, all fall within the scope of protection of this disclosure.

What is claimed is:

1. A communications network switching method, applied to a terminal device in which at least two subscriber identity modules (SIMs) are installed, wherein the method comprises:
   detecting whether a first SIM of the at least two SIMs meets a first trigger condition; and
   performing communication processing based on a second SIM of the at least two SIMs if the first SIM meets the first trigger condition; wherein
   the terminal device is in a radio resource control (RRC) connected state in a communications network to which the first SIM belongs; and the first trigger condition comprises at least one of:
   that an intra-frequency cell handover procedure initiated by the terminal device with respect to the communications network to which the first SIM belongs meets a first condition; or
   that an inter-frequency cell handover procedure initiated by the terminal device with respect to the communications network to which the first SIM belongs meets a second condition;
      wherein the first condition comprises at least one of: handover failure; or handover success, but a signal quality of a target cell corresponding to intra-frequency cell handover is lower than a second preset signal quality; and
      the second condition comprises at least one of: handover failure; or handover success, but a signal quality of a target cell corresponding to inter-frequency cell handover is lower than a third preset signal quality;
   or
   the terminal device is in an RRC idle state or an RRC inactive state in a communications network to which the first SIM belongs; and the first trigger condition comprises at least one of:
   that an intra-frequency cell reselection procedure initiated by the terminal device with respect to the communications network to which the first SIM belongs meets a fourth condition; or
   that an inter-frequency cell reselection procedure initiated by the terminal device with respect to the communications network to which the first SIM belongs meets a fifth condition;
      wherein the fourth condition comprises at least one of: reselection failure; or reselection success, but a signal quality of a target cell corresponding to intra-frequency cell reselection is lower than a fifth preset signal quality; and
      the fifth condition comprises at least one of: reselection failure; or reselection success, but a signal quality of a target cell corresponding to inter-frequency cell reselection is lower than a sixth preset signal quality.

2. The method according to claim 1, wherein the terminal device is in an RRC connected state in a communications network to which the first SIM belongs; and
   the first trigger condition further comprises at least one of:
   that a signal quality of the terminal device in a serving cell of the communications network to which the first SIM belongs is lower than a first preset signal quality;
   that an initial radio access procedure of at least one of radio access technologies of an operator corresponding to the communications network to which the first SIM belongs meets a third condition;
   that a data rate of the terminal device in the communications network to which the first SIM belongs is lower than a preset data rate;
   that resource utilization of the terminal device in the communications network to which the first SIM belongs is lower than preset resource utilization; or
   that service access of the terminal device to the communications network to which the first SIM belongs is under control.

3. The method according to claim 2, wherein the third condition comprises at least one of:
   initial access failure; or
   that a transmission parameter value for initial access is less than a preset transmission parameter threshold, wherein the transmission parameter comprises a signal quality and/or a data rate.

4. The method according to claim 1, wherein the terminal device is in an RRC idle state or an RRC inactive state in a communications network to which the first SIM belongs; and
   the first trigger condition comprises at least one of:
   that a signal quality of the terminal device in a serving cell of the communications network to which the first SIM belongs is lower than a fourth preset signal quality;
   that an initial radio access procedure of at least one of radio access technologies of an operator corresponding to the communications network to which the first SIM belongs meets a sixth condition; or
   that service access of the terminal device to the communications network to which the first SIM belongs is under control.

5. The method according to claim 4, wherein the sixth condition comprises at least one of:
   initial access failure; or
   that a signal quality of initial access is lower than a preset signal quality.

6. The method according to claim 4, wherein the terminal device is in the RRC idle state or the RRC inactive state in a communications network to which the second SIM belongs; and
   the first trigger condition further comprises:
   that a signal quality of the terminal device in a serving cell of the communications network to which the second SIM belongs is higher than the signal quality of the terminal device in the serving cell of the communications network to which the first SIM belongs.

7. The method according to claim 1, wherein the second SIM comprises:
   a SIM corresponding to a target communications network, wherein a priority of the target communications network is higher than priority (ies) of communications network(s) to which other SIM(s) of the at least two SIMs belong.

8. The method according to claim 1, wherein the terminal device is in an RRC connected state in the communications network to which the second SIM belongs; and
   the performing communication processing based on a second SIM of the at least two SIMs comprises:
   performing data transmission based on the communications network to which the second SIM belongs;
   or
   the terminal device is in an RRC idle state or an RRC inactive state in the communications network to which the second SIM belongs; and the performing communication processing based on a second SIM of the at least two SIMs comprises:
establishing an RRC connection based on the communications network to which the second SIM belongs.

9. The method according to claim 8, wherein after the establishing an RRC connection based on the communications network to which the second SIM belongs, the method further comprises:
performing data transmission based on the communications network to which the second SIM belongs and with which the RRC connection is established.

10. The method according to claim 1, wherein the terminal device camps on a second-generation mobile communications technology (2G) communications network cell or a third-generation mobile communications technology (3G) communications network cell to which the second SIM belongs; and
the performing communication processing based on a second SIM of the at least two SIMs comprises:
performing measurement on a fourth-generation mobile communications technology (4G) communications network cell or a fifth-generation mobile communications technology (5G) communications network cell to which the second SIM belongs to obtain a cell measurement result.

11. The method according to claim 10, wherein after the obtaining a cell measurement result, the method further comprises:
establishing an RRC connection based on the cell measurement result and the communications network to which the second SIM belongs; and
performing data transmission based on the communications network to which the second SIM belongs and with which the RRC connection is established.

12. A terminal device, having at least two subscriber identity modules (SIMs) installed, wherein the terminal device comprises a memory, a processor, and a computer program that is stored in the memory and executable on the processor, wherein
the computer program, when executed by the processor, causes the terminal device to perform:
detecting whether a first SIM of the at least two SIMs meets a first trigger condition; and
performing communication processing based on a second SIM of the at least two SIMs if the first SIM meets the first trigger condition; wherein
the terminal device is in a radio resource control (RRC) connected state in a communications network to which the first SIM belongs; and the first trigger condition comprises at least one of:
that an intra-frequency cell handover procedure initiated by the terminal device with respect to the communications network to which the first SIM belongs meets a first condition; or
that an inter-frequency cell handover procedure initiated by the terminal device with respect to the communications network to which the first SIM belongs meets a second condition;
wherein the first condition comprises at least one of: handover failure; or handover success, but a signal quality of a target cell corresponding to intra-frequency cell handover is lower than a second preset signal quality; and
the second condition comprises at least one of: handover failure; or handover success, but a signal quality of a target cell corresponding to inter-frequency cell handover is lower than a third preset signal quality;
or
the terminal device is in an RRC idle state or an RRC inactive state in a communications network to which the first SIM belongs; and the first trigger condition comprises at least one of:
that an intra-frequency cell reselection procedure initiated by the terminal device with respect to the communications network to which the first SIM belongs meets a fourth condition; or
that an inter-frequency cell reselection procedure initiated by the terminal device with respect to the communications network to which the first SIM belongs meets a fifth condition;
wherein the fourth condition comprises at least one of: reselection failure; or reselection success, but a signal quality of a target cell corresponding to intra-frequency cell reselection is lower than a fifth preset signal quality; and
the fifth condition comprises at least one of: reselection failure; or reselection success, but a signal quality of a target cell corresponding to inter-frequency cell reselection is lower than a sixth preset signal quality.

13. The terminal device according to claim 12, wherein the terminal device is in an RRC connected state in a communications network to which the first SIM belongs; and
the first trigger condition further comprises at least one of:
that a signal quality of the terminal device in a serving cell of the communications network to which the first SIM belongs is lower than a first preset signal quality;
that an initial radio access procedure of at least one of radio access technologies of an operator corresponding to the communications network to which the first SIM belongs meets a third condition;
that a data rate of the terminal device in the communications network to which the first SIM belongs is lower than a preset data rate;
that resource utilization of the terminal device in the communications network to which the first SIM belongs is lower than preset resource utilization; or
that service access of the terminal device to the communications network to which the first SIM belongs is under control.

14. The terminal device according to claim 13,
wherein the third condition comprises at least one of:
initial access failure; or
that a transmission parameter value for initial access is less than a preset transmission parameter threshold, wherein the transmission parameter comprises a signal quality and/or a data rate.

15. A non-transitory computer-readable storage medium, wherein the non-transitory computer-readable storage medium stores a computer program, and the computer program, when executed by a processor of a terminal device, causes the terminal device to perform:
detecting whether a first subscriber identity modules (SIM) of the at least two SIMs meets a first trigger condition; and
performing communication processing based on a second SIM of the at least two SIMs if the first SIM meets the first trigger condition; wherein the terminal device is in a radio resource control (RRC) connected state in a communications network to which the first SIM belongs; and the first trigger condition comprises at least one of:

that an intra-frequency cell handover procedure initiated by the terminal device with respect to the communications network to which the first SIM belongs meets a first condition; or that an inter-frequency cell handover procedure initiated by the terminal device with respect to the communications network to which the first SIM belongs meets a second condition;

wherein the first condition comprises at least one of: handover failure; or handover success, but a signal quality of a target cell corresponding to intra-frequency cell handover is lower than a second preset signal quality; and the second condition comprises at least one of: handover failure; or handover success, but a signal quality of a target cell corresponding to inter-frequency cell handover is lower than a third preset signal quality;

or the terminal device is in an RRC idle state or an RRC inactive state in a communications network to which the first SIM belongs; and the first trigger condition comprises at least one of:

that an intra-frequency cell reselection procedure initiated by the terminal device with respect to the communications network to which the first SIM belongs meets a fourth condition; or that an inter-frequency cell reselection procedure initiated by the terminal device with respect to the communications network to which the first SIM belongs meets a fifth condition;

wherein the fourth condition comprises at least one of: reselection failure; or reselection success, but a signal quality of a target cell corresponding to intra-frequency cell reselection is lower than a fifth preset signal quality; and the fifth condition comprises at least one of: reselection failure; or reselection success, but a signal quality of a target cell corresponding to inter-frequency cell reselection is lower than a sixth preset signal quality.

16. The non-transitory computer-readable storage medium according to claim 15, wherein the terminal device is in an RRC connected state in a communications network to which the first SIM belongs; and the first trigger condition further comprises at least one of:

that a signal quality of the terminal device in a serving cell of the communications network to which the first SIM belongs is lower than a first preset signal quality;

that an initial radio access procedure of at least one of radio access technologies of an operator corresponding to the communications network to which the first SIM belongs meets a third condition;

that a data rate of the terminal device in the communications network to which the first SIM belongs is lower than a preset data rate;

that resource utilization of the terminal device in the communications network to which the first SIM belongs is lower than preset resource utilization; or that service access of the terminal device to the communications network to which the first SIM belongs is under control.

17. The terminal device according to claim 12, wherein the terminal device is in an RRC idle state or an RRC inactive state in a communications network to which the first SIM belongs; and the first trigger condition comprises at least one of:

that a signal quality of the terminal device in a serving cell of the communications network to which the first SIM belongs is lower than a fourth preset signal quality;

that an initial radio access procedure of at least one of radio access technologies of an operator corresponding to the communications network to which the first SIM belongs meets a sixth condition; or that service access of the terminal device to the communications network to which the first SIM belongs is under control.

18. The terminal device according to claim 17, wherein the sixth condition comprises at least one of:

initial access failure; or that a signal quality of initial access is lower than a preset signal quality.

19. The terminal device according to claim 12, wherein the second SIM comprises:

a SIM corresponding to a target communications network, wherein a priority of the target communications network is higher than priority (ies) of communications network(s) to which other SIM(s) of the at least two SIMs belong.

20. The terminal device according to claim 12, wherein the terminal device is in an RRC connected state in the communications network to which the second SIM belongs; and the computer program, when executed by the processor, causes the terminal device to perform:

performing data transmission based on the communications network to which the second SIM belongs;

or the terminal device is in an RRC idle state or an RRC inactive state in the communications network to which the second SIM belongs; and the computer program, when executed by the processor, causes the terminal device to perform:

establishing an RRC connection based on the communications network to which the second SIM belongs.

* * * * *